(12) United States Patent
Fox, Jr.

(10) Patent No.: US 6,994,295 B2
(45) Date of Patent: Feb. 7, 2006

(54) QUONSET TYPE PARACHUTE

(76) Inventor: Roy L. Fox, Jr., Rte. 1 Box 32A, Belleville, WV (US) 26133

( * ) Notice: Subject to any disclaimer, the term of this patent is extended or adjusted under 35 U.S.C. 154(b) by 0 days.

(21) Appl. No.: 10/789,343

(22) Filed: Mar. 1, 2004

(65) Prior Publication Data

US 2005/0284985 A1    Dec. 29, 2005

(51) Int. Cl.
*B64D 17/02* (2006.01)

(52) U.S. Cl. .................................................. 244/145
(58) Field of Classification Search ............... 244/145, 244/142, 138 R, 151 A See application file for complete search history.

(56) References Cited

U.S. PATENT DOCUMENTS

| | | | | | |
|---|---|---|---|---|---|
| 1,757,247 | A | * | 5/1930 | Hoffman | 244/145 |
| 2,447,187 | A | * | 8/1948 | Kunkler | 244/142 |
| 2,501,670 | A | * | 3/1950 | Fogal | 244/145 |
| 3,131,894 | A | * | 5/1964 | Jalbert | 244/145 |
| 3,504,874 | A | * | 4/1970 | Lemoigne | 244/142 |
| 4,470,567 | A | * | 9/1984 | Puskas | 244/145 |
| 4,730,796 | A | * | 3/1988 | Puskas | 244/142 |
| 5,078,344 | A | * | 1/1992 | Buckley | 244/145 |
| 5,573,207 | A | * | 11/1996 | Germain | 244/145 |
| 5,967,463 | A | * | 10/1999 | Payne | 244/145 |

* cited by examiner

*Primary Examiner*—Tien Dinh
(74) *Attorney, Agent, or Firm*—John J. Giblin, Jr.; Anthony P. Tokarz; Bowles Rice McDavid Graff & Love LLP

(57) ABSTRACT

A novel parachute design is presented that is distinguished by having inverted-gores, producing a parachute having a unique shape, which can be, selectively, either ballistic or gliding and steerable, in addition to having a selectively variable rate of descent. Moreover, the parachute design allows for a very efficient use of materials.

7 Claims, 5 Drawing Sheets

//  QUONSET TYPE PARACHUTE

FIELD OF THE INVENTION

The present invention relates to the field of parachutes and, more particularly, to a novel type of parachute that will equal, or surpass, the performance characteristics of a conventional circular/hemispherical type parachute and, in some ways, controllably mimic the performance characteristics of a higher performance, parafoil type, gliding wing, parachute.

In general terms, for personnel use, and for the aerial delivery of cargo, there are two types of parachutes in use today. One type is the circular/hemispherical, drag producing, ballistic parachute, commonly known in the trade as a round parachute, although it is typically constructed as a polygon. The other type is a ram-air inflatable wing, which is a lift producing, gliding parachute, commonly known in the trade as a parafoil or a square parachute, although it is generally rectangular or elliptical in plan form.

The circular/hemispherical, ballistic, type parachute has been in use for many, many, decades and continues to be the most widely used parachute type, by a huge margin. Performance of this type of parachute is almost entirely dependent on drag because it has extremely little gliding or lift generating capability. In many instances, having no true gliding capability, drifting only where the wind carries it, is not only acceptable, it is quite desirable. For instance; during mass parachute deployments of military troops or equipment, the non-gliding feature of the circular/hemispherical, ballistic, type parachutes allows these uncontrolled parachutes to generally maintain relative separation. This feature greatly reduces the opportunities for parachute collisions and subsequent entanglements.

The parafoil type parachute is a ram-air inflatable wing and is, therefore, very dependent on a relatively fast forward glide to produce lift; just as the forward velocity of an airplane wing produces lift. The parafoil type parachute is also quite steerable, making it highly maneuverable. The gliding and lift producing characteristics of the parafoil type parachute, coupled with omnidirectional steering, allows it to glide long distances and be accurately maneuvered to a precise landing point. The attributes of the parafoil type parachute make it the overwhelming choice for modern day skydivers and military operations when precision landing of troops or cargo is the goal.

The very features that make the parafoil type parachute extremely desirable for some select applications make it much less desirable for other applications, however. Properties that allow the parafoil type parachute to glide long distances, and be highly maneuverable, require that it have a costly guidance and control system for delivering cargo to precise target locations or that it be operated by only highly skilled parachutists when used as a personnel parachute.

The circular/hemispherical, ballistic, type parachute, even coupled with a guidance and control system, is typically inadequate for accurate target attainment but the parafoil type parachute may have excessive capabilities and, in some instances, introduce more problems than it solves. The properties that permit this type of parachute to be guided to a very specific target will also allow it to reach a point very distant from the desired target if not steered correctly. Additionally, even though parachutists using the parafoil type-parachutes are typically very skilled, some number of deaths occur each year as the result of high speed landings or midair collisions with fellow parachutists and/or the ensueing entanglements that cause crash landings after the entangled parafoils lose their forward velocity and, consequently, their lift. Moreover, the parafoil type parachutes are very labor intensive to fabricate and are, therefore, quite costly when compared to a circular/hemispherical type parachute of the same general size.

Circular/hemispherical parachute canopies are occasionally provided with directional venting, which allows them to be steered to a desired heading, but their gliding performance is extremely low. Even though this steering technique has been known for many years, parachutes having this configuration are used very little and, when used, are used almost exclusively as personnel parachutes. Because of very little capability for traversing through an air mass, and the high cost for guidance and control, this type of parachute has not generally been considered to be sufficiently effective for guided cargo aerial delivery systems.

Many large scale users of parachute systems, such as military organizations, find themselves in a dilemma: Generally, a choice must be made between a simple low cost, ballistic, circular/hemispherical type parachute system, having very little target acquisition capability, or a high cost, high performance, parafoil type parachute system, requiring a sophisticated guidance and control system or highly skilled parachutists to operate reliably. In actual practice, many large scale users of parachutes must maintain both types of parachute systems in their inventory.

BACKGROUND OF THE INVENTION

There are two types of parachute systems in general use today, for large scale users, such as military organizations. One type features the circular/hemispherical, generally ballistic, parachutes, having very little capability for traversing an air mass, and the other features the high performance, inflatable wing, parafoils that require highly sophisticated guidance and control devices, or highly skilled parachutists, to operate reliably.

Generally speaking, both the ballistic and high glide types of parachute systems must be kept in inventory, and operations managers must chose between one or the other, because the systems are not interchangeable and there is no system to bridge the gap between the two.

While it is much less costly to fabricate a circular/hemispherical type parachute than a parafoil type parachute, of the same general size, construction of the circular/hemispherical type of parachute is, nevertheless, not especially efficient when the amount of fabric used in the construction is considered. A typical circular/hemispherical type parachute canopy is generally constructed from multiple triangular gore panels that radiate from a central point, and is depicted by FIG. 6. Generally, the gore panels are truncated to provide the parachute canopy with a centrally located vent and, occasionally, the triangular gore shape is slightly modified to provide a more aerodynamically appropriate shape for a specific application. Extending outward from the canopy skirt, generally from the radial seams that join the gores, are suspension members with a length that generally approximate the constructed diameter of the canopy.

When properly inflated, the circular/hemispherical type parachute canopy will be reduced around its entire circumference, resulting in a projected diameter that is reduced by approximately one third of its constructed diameter. An undesirable consequence of a circular/hemispherical canopy that has been effectively reduced by approximately 33.3% of its constructed diameter is that it projects a drag area that has been reduced by approximately 44.4% of its constructed area. The outermost circle of FIG. 4 illustrates the constructed area of a circular/hemispherical type parachute canopy and the shaded portion of the figure depicts the relative inflated size. Additionally, the circular/hemispherical parachute has very little capability for altering its ballistic path to enable it to reach a specific target.

Parafoil type parachute canopies are multiple cell, airfoil shaped, ram-air inflatable, wings made of many complex panel shapes requiring demanding fabrication processes. To establish the rigging angle necessary to achieve a desired glide angle, and maintain the desired airfoil shape, great variation in the length of the suspension lines is necessary, depending on their designated locations. When properly inflated, a parafoil type parachute has a generally rectangular, or elliptical, plan form, and, quite frequently, has a span that is approximately 250% of its chord. While parafoils have very impressive flight characteristics, if not properly controlled during flight, they can miss their intended targets by huge amounts and, if not properly controlled at landing, can severely damage delivered payloads and injure or kill parachutists.

It is therefore an object of the invention to provide a novel parachute design that will efficiently fulfill all the performance requirements of the low cost, low performance, circular/hemispherical type parachute and many of the requirements of the high cost, high performance, parafoil type parachute with a simple to construct, low cost, parachute.

It is another object of the invention to provide a parachute having a canopy with a generally rectangular plan form.

It is another object of the invention to provide a parachute having inverted-gores.

It is another object of the invention to provide a parachute having canopy segments.

It is another object of the invention to provide a parachute having longitudinal seams.

It is another object of the invention to provide a parachute having, downwardly converging, suspension lines.

It is another object of the invention to provide a parachute having riser assemblies.

It is another object of the invention to provide a parachute having canopy end panels.

It is another object of the invention to provide a parachute that is selectively ballistic or gliding.

It is another object of the invention to provide a parachute that is selectively steerable.

It is another object of the invention to provide a parachute with a selectively variable descent rate.

It is another object of the invention to provide a parachute with efficient materials utilization.

SUMMARY OF THE INVENTION

In accordance with the present invention, there is provided a very simple technique that can be used to design a parachute canopy that will provide approximately 50% more projected drag area than a circular/hemispherical type parachute canopy when constructed from a given amount of fabric. Furthermore, this basic canopy design will produce a parachute that will have, selectively, moderate glide performance along with favorable maneuvering capabilities. This novel parachute, while descending, can transition, controllably, from ballistic, to gliding, and from gliding to ballistic, as circumstances dictate. Beyond that, this parachute design allows for a simple control feature that enables its vertical velocity to be adjusted so that it exceeds the nominal descent rate or decreased to less than the nominal descent rate. The inflated canopy shape of this parachute is roughly that of a half cylinder and it is referred to as a quonset type parachute.

The canopy for the quonset type parachute is fabricated of gores, somewhat like the gores of a circular/hemispherical parachute canopy, but they are inverted, relative to a circular/hemispherical parachute, and appear as narrow canopy segments, joined side by side, with longitudinal seams, as illustrated by FIG. 1. This geometry results in a parachute canopy that is constructed as a generally rectangular plan form, instead of a circular plan form. One gore is illustrated by FIG. 2. Two gores, inverted, illustrated by FIG. 3, compose a canopy segment. FIG. 3 further illustrates that a canopy segment can be cut from a single piece of fabric, as an alternative technique. The simple design feature of inverting the gores has a profound impact on the resulting canopy shape and, consequently, the parachute performance capabilities.

A quonset type parachute canopy, constructed from an identical amount of fabric as a circular/hemispherical canopy, when properly inflated, will have a size reduction in the chordwise direction only and will, therefore, have a projected drag area that is approximately 66.7% of the constructed area. The outermost lines of FIG. 5 illustrate the constructed area of a quonset type parachute canopy and the shaded area of the figure illustrates the relative inflated size. As the result of this configuration, the projected drag area of the quonset type parachute canopy, for an equal amount of fabric, has approximately 150% of the projected drag area of a circular/hemispherical type parachute canopy. For the user, this means that, for a specific amount of suspended weight, the canopy size can be reduced by approximately 33.3%. Or, for a specific amount of fabric, the amount of suspended weight can be increased by approximately 50%.

When compared to a circular/hemispherical parachute, a parafoil type parachute, of the same general size, is very costly. In many instances, the increased cost for the parafoil type parachute is considered to be worthwhile because it provides a parachute that can efficiently traverse an air column in which it is descending and has good target reaching capabilities. However, if the parafoil type parachute is not properly controlled, its high performance features can cause it to miss the intended target by huge factors. Additionally, because of the high velocity gliding feature of the parafoil type parachute, landings are a particular problem. To reduce the velocity of autonomously guided parafoil type cargo delivery systems, it is very desirable to have an accurate altitude sensing device, such as a radar altimeter, coupled to the controlling device to cause a precisely timed flared landing maneuver. Obviously, such sophisticated equipment is very costly. For parachutists, on the other hand, it is necessary to clearly see the landing spot and have the proper skills to correctly perform the precisely timed flared landing maneuver, at the precise altitude, that will contribute to landing safely.

The quonset type parachute has improved ballistic performance over the circular/hemispherical type parachute and, selectively, many of the steering and maneuvering characteristics of the parafoil type parachute, although to a lesser degree. Moreover, by landing ballistically, the quonset type parachute is not dependent on a precisely timed flared landing maneuver to decrease landing velocity.

In some instances, it is quite desirable to maneuver a parachute to a point above a target and then maintain that general position. The unique performance capabilities of the quonset type parachute allows this to be done quite conveniently.

The quonset type parachute can be deployed as a ballistic parachute then, if desired, it can selectively transition to become a gliding, steerable, parachute, having performance characteristics somewhat like the parafoil type parachute, to reach a specific target area. Over the target, or on the glide path to the target, the parachute can, selectively, transition into a ballistic parachute, again. Depending on specific needs, the descent rate of the quonset type parachute can be altered to cause a rate that is above nominal or below nominal. This combination of features is not attainable with either the circular/hemispherical type parachute or the parafoil type parachute.

Even though the circular/hemispherical type parachute is considered to be generally ballistic, by retracting the suspension members on one side and/or extending the suspension members on the opposite side, the canopy skirt will be caused to tilt, relative to horizontal, and relatively high pressure air from the canopy interior will vent from beneath the elevated side of the canopy skirt and push the parachute in the opposite direction. Because the inflated parachute canopy is roughly hemispherical, not at all wing-like, extremely little lift is generated and the traversing movement, known a slipping, is very inefficient.

It is not uncommon for slipping maneuvers to be accomplished with slip-riser assemblies. Conventionally, one slip-riser assembly is used for the left side of the parachute assembly and another slip-riser assembly is used for the right side. Each slip-riser assembly typically consists of a front riser leg joined to a rear riser leg and is configured to cause a rear riser leg extension as the result of a front riser leg retraction, and vise versa. This process, while enabling a circular/hemispherical parachute canopy to move transversally, will not cause it to quickly change heading by spinning or spiraling as part of the process, however. The insignificant rotational capability provides a parachutist, or the operator of a circular/hemispherical parachute cargo delivery system, very little heading control, relative to wind direction. A choice of heading may be especially desirable when landing. Statistically, and randomly, 25% of all landings, when using conventional circular/hemispherical parachutes, will be landings with forward drift, landings with left or right drift will be split evenly, with 25% in each direction, and 25% will be landings while drifting to the rear. Regardless of the skill of the parachutist, a rearward landing is more likely to result in injury than is a landing with drift in any other direction. Use of the quonset type parachute will allow a great majority of landings to have the most desirable heading for the particular circumstance.

It is quite feasible for the quonset type parachute to utilize conventional slip-riser assemblies if controlled maneuvering is desired. When using the slip-riser maneuvering technique, the risers for both sides of the parachute can be manipulated, in unison, to cause a forward glide. By reversing the riser positions, a rearward glide will be produced. Because the quonset type parachute canopy plan form is much more wing-like than the canopy of the circular/hemispherical type parachute, the gliding performance is considerably more pronounced, and efficient, than that of a parachute having a circular/hemispherical canopy. If the riser assembly on only one side of the parachute is manipulated, the quonset type parachute will make a heading change and the canopy can then be caused to glide in a new direction. Or, if desired, it can simply maintain the new heading, without glide. If an increased rate of descent is desired, the riser assembly on one side can be manipulated to cause a turn and, if the riser position remains unchanged, a spiraling turn will result.

Spiraling turns are aerodynamically inefficient and the rate of descent will increase as a result. If, on the other hand, the riser assembly on one side is manipulated to cause a turn in one direction and the opposite riser assembly is manipulated in a similar fashion, the quonset type parachute canopy will twist to become somewhat propeller-like, and spin about its vertical axis, producing lift, just as the spinning blades of a helicopter produce lift if the helicopter engine has lost power. Logically, when the parachute canopy begins producing lift it will have a decrease in its relative rate of descent.

The very unique maneuvering capabilities of the quonset type parachute, coupled with excellent economy of construction, is not known to exist with any other parachute type.

As for parachutes of many other types, the designer of a quonset type parachute canopy can select from fabric offering the most desirable degree of permeability for a specific application, or the canopy can be made from strips of fabric, or ribbons, or be produced with specifically sized and located orifices, to produce a canopy with a specific geometric porosity and/or directional venting.

It has been learned that the performance of the quonset type parachute can be enhanced by having a panel installed in each end of the semi-cylindrical canopy to inhibit transverse airflow from the canopy interior. A semicircular end panel, completely filling the opening at each end of the quonset parachute canopy, as depicted by FIG. 1, is most effective but a partial panel, such as one shaped as a crescent, is somewhat effective and has less bulk than a semicircular end panel. However, a complete semi-circular end panel will cause the inflated canopy shape to become somewhat elliptical, and will slightly increase the canopy span. If installed, end panels are considered to be components of the parachute canopy assembly.

As is true for any type of wing-like gliding device, the gliding performance of the quonset type parachute can be enhanced by increasing the span ratio, relative to the chord. The size and aspect ratio of the quonset type parachute canopy is primarily dependent on the number of canopy segments utilized and/or the size of the canopy segments.

Depending on loading conditions, it may be desirable to install suspension lines on the end panels of the quonset type parachute canopy. Specific loading factors will dictate any end panel reinforcement required as well as the number of suspension lines required and the precise shape of the end panel will dictate the length of the suspension members.

To properly manage the opening forces that a parachute is subjected to, it is frequently desirable to prolong the opening process of the parachute canopy by a technique known as reefing. It has been learned that the quonset type parachute is compatible with all conventional reefing techniques such as peripheral reefing, spanwise reefing, or slider reefing. Because of its simplicity and low cost, it is expected that slider reefing will typically be chosen when reefing is desired for the quonset type parachute.

Because of the very simple shape, the quonset type parachute can easily be constructed in modular form. For large scale quonset type parachutes, modularity will allow convenient disassembly for handling or repair.

As with all parachutes of all types, the parachute size, the suspended weight, and the predicted aerodynamic forces will dictate the number, and strength, of all materials for the design and construction of a quonset type parachute, in addition to dictating the strength of seams and joints that must be used.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
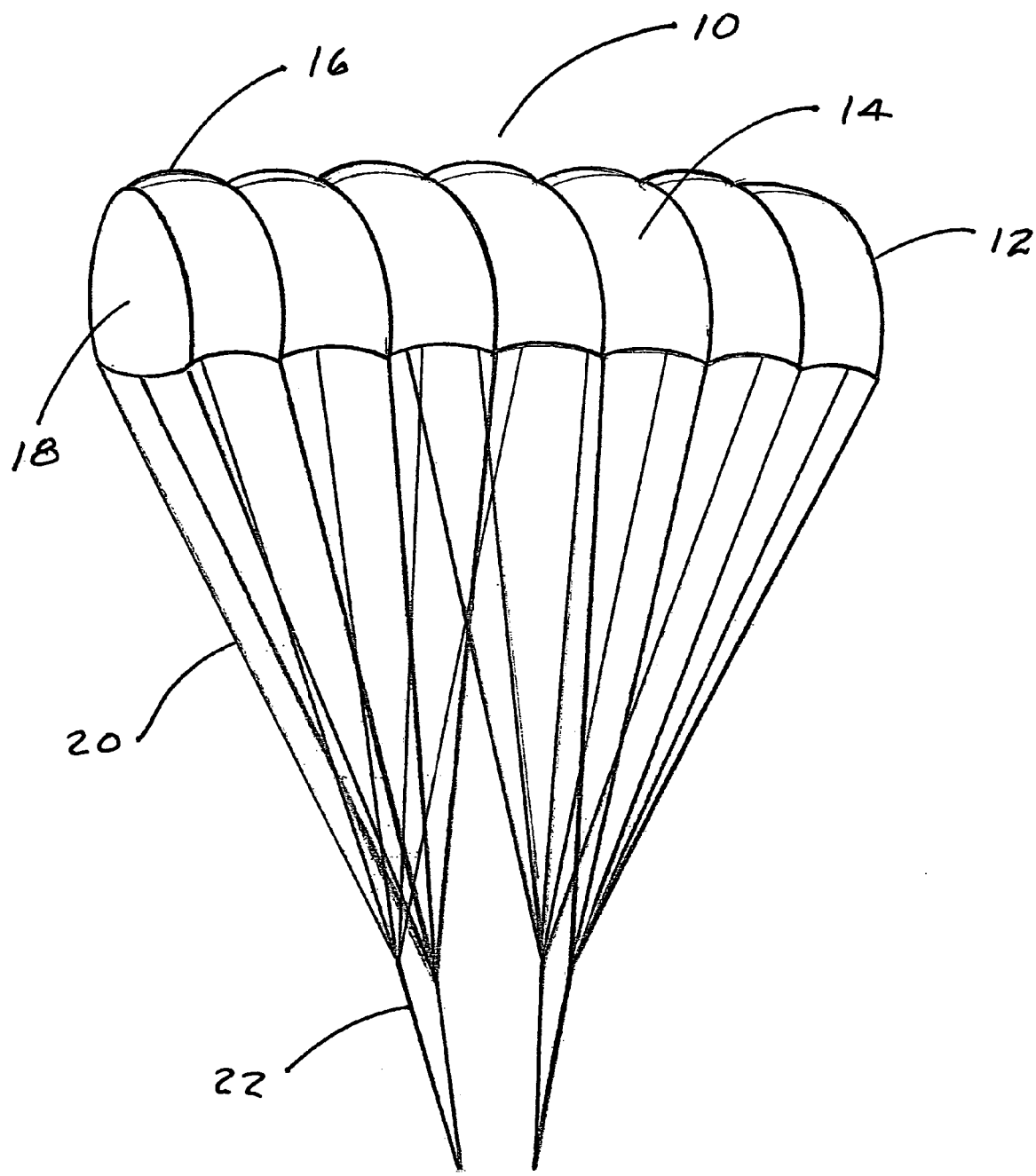
FIG. 1 is a perspective view of a properly inflated quonset type parachute having a canopy assembly, inverted-gores, canopy segments, longitudinal seams, end panels, suspension lines, and slip-riser assemblies.

FIG. 1 is a perspective view of a quonset type parachute assembly 10. This quonset type parachute assembly 10 consists of a generally semi-cylindrical canopy assembly 12, of an approximately 2.0:1 span to chord aspect ratio when properly inflated, comprised of inverted-gores 14, combined as canopy segments 16, having anhedral arc incorporated as the result of the inverted-gore 14 orientation, along with semicircular end panels 18, in addition to suspension lines 20, and slip-riser assemblies 22, that when combined, in series, have a length that is approximately equal to 100% of the canopy assembly 12 span.

Figure 2:
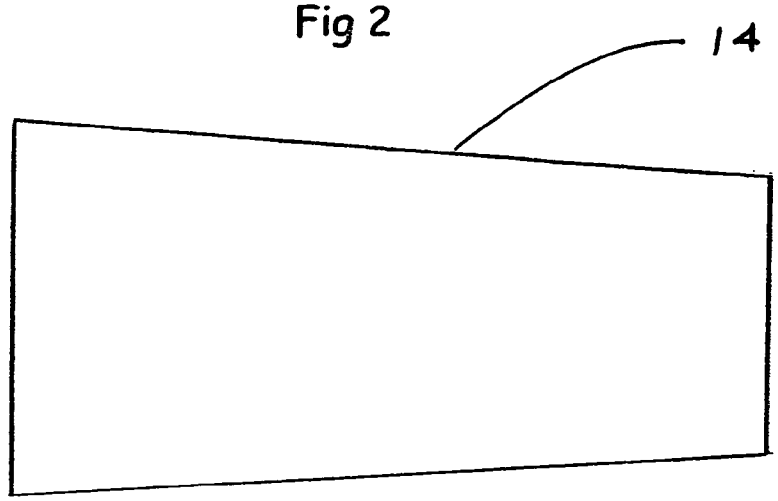
FIG. 2 is a top view of an inverted-gore.

FIG. 2 is an inverted-gore 14.

Figure 3:
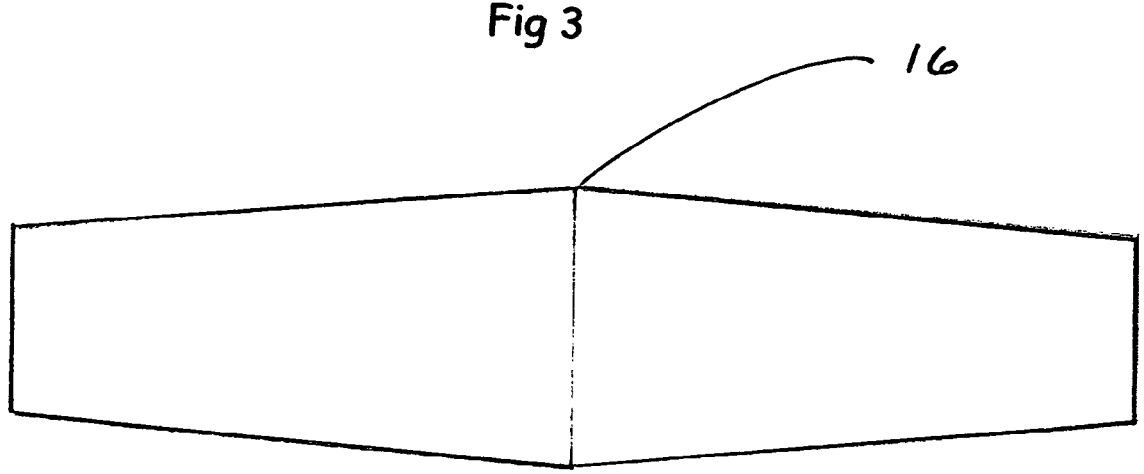
FIG. 3 is a top view of a canopy segment comprised of two inverted-gores.

FIG. 3 is a canopy segment 16.

Figure 4:
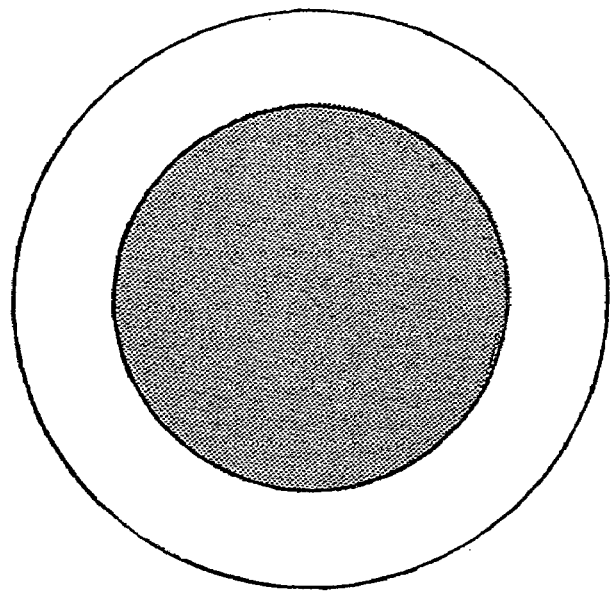
FIG. 4 is a top view of a conventional circular/hemispherical parachute canopy, having a constructed area and an inflated area.

FIG. 4 is a top view of a conventional circular/hemispherical parachute canopy having a constructed area and an inflated area.

Figure 5:
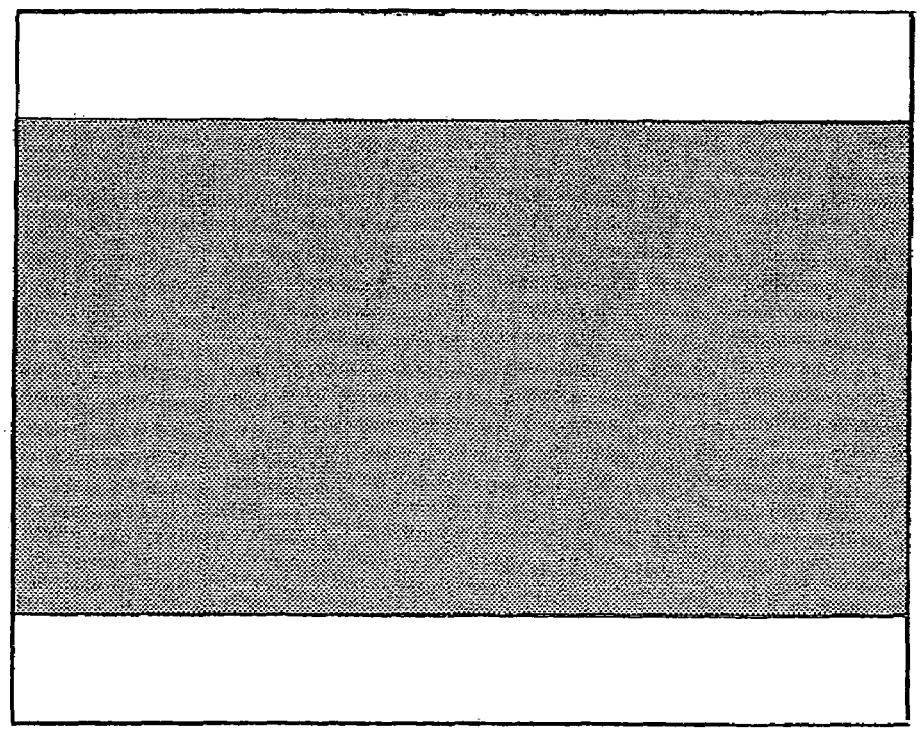
FIG. 5 is a top view of a quonset type parachute canopy, having a constructed area and an inflated area.

FIG. 5 is a top view of a quonset parachute canopy having a constructed area and an inflated area.

Figure 6:
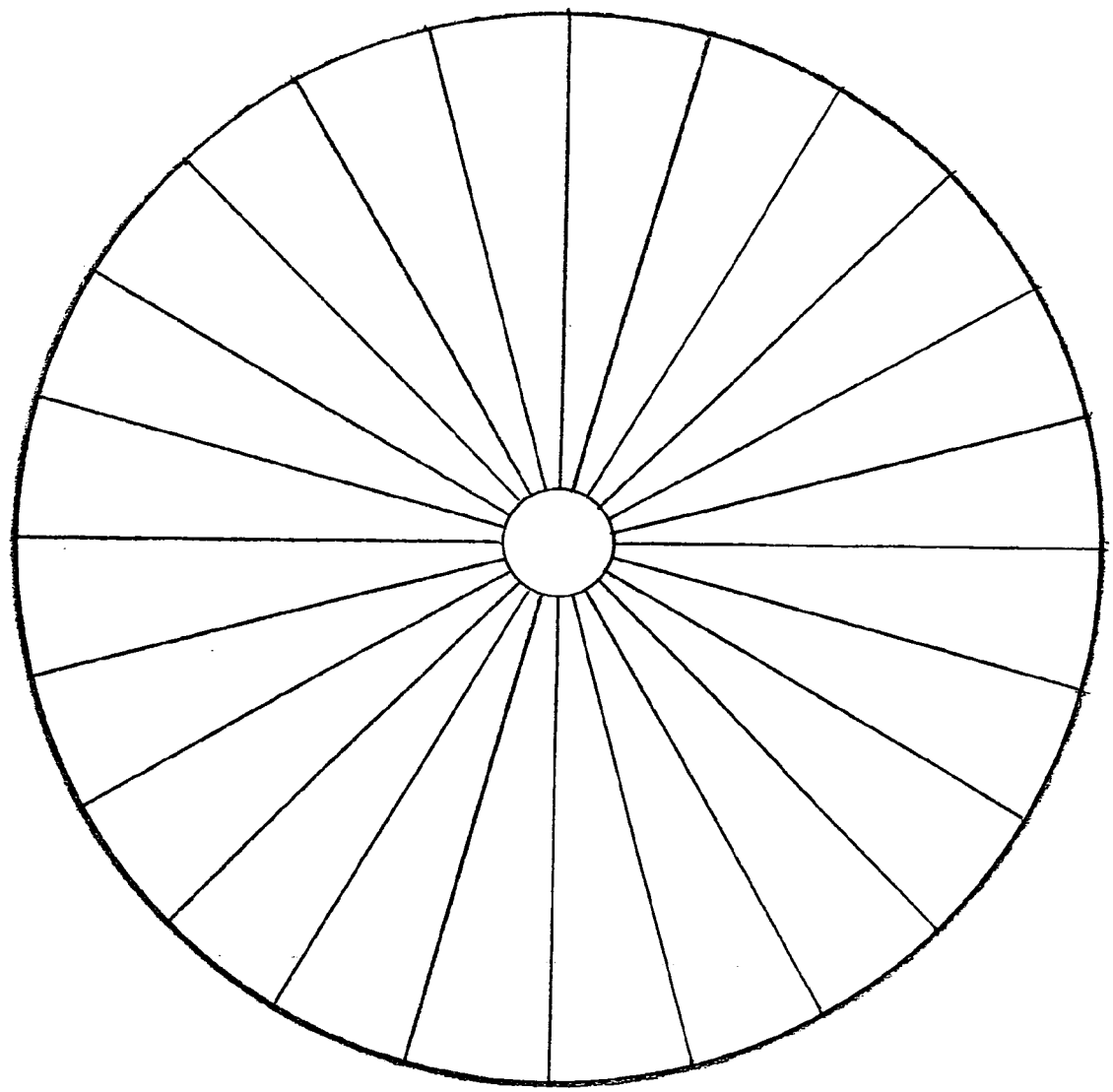
FIG. 6 is a top view of a parachute canopy having conventional circular/hemispherical geometery.

FIG. 6 is a circular/hemispherical parachute canopy with conventional canopy geometry.

Figure 7:
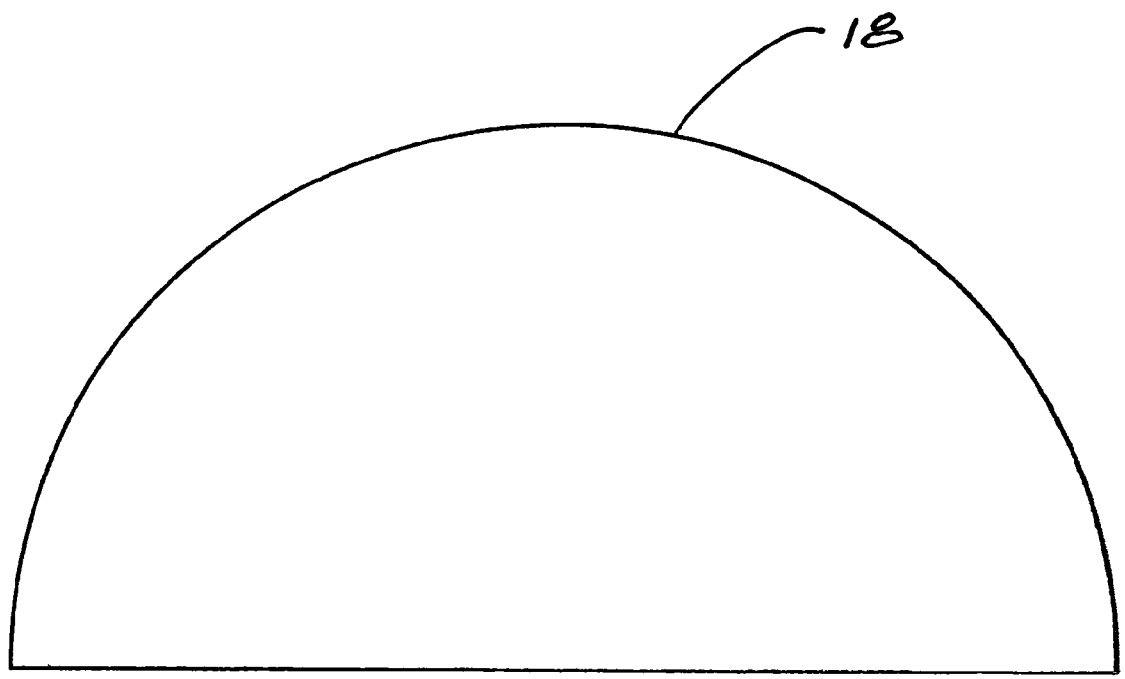
FIG. 7 is a front view of a semicircular end panel.

FIG. 7 is a semi-circular end panel 18.

Beginning with a selected inflated area, of an approximately 2.0:1 span to chord aspect ratio; multiply the span dimension by 0.392 to obtain a centerline chord dimension for the design of an inverted-gore 14. Divide the span dimension by the desired number of canopy segments 16, which is seven for this illustration, to obtain a design dimension for the the span of each inverted-gore 14. Multiply the span dimension of the inverted-gore 14 by 0.8 to obtain a design dimension for the skirt of each inverted-gore 14. Multiply the resulting inverted-gore 14 hypotenuse dimension by 2 and divide by pi to obtain a design radius for a semicircular end panel 18. Multiply the span dimension by 1.0 to obtain the design length dimension for each suspension line 20 and slip-riser assembly 22 serial combination.

After providing for typical seam and hem allowances, cut fourteen inverted-gores 14, as illustrated by FIG. 2, from an appropriate fabric and join them, as pairs, along their spans to form seven canopy segments 16, as illustrated by FIG. 3. Join the canopy segments 16, in series, along their hypotenuse edges, to form a roughly rectangular canopy assembly 12 having a constructed chord dimension that is approximately 80% of the span dimension. Provide for typical seam and hem allowances and cut two semicircular end panels 18 from an appropriate fabric. Install an end panel 18 in each outboard end of the canopy assembly 12, as depicted by FIG. 1. Mark and cut fourteen suspension lines 20, that when joined, serially, to the riser assemblies 22, will have a finished dimension that is approximately 100% of the canopy assembly 12 span dimension. Install one suspension line 20 at the junction of the canopy assembly 12 skirt and each longitudinal seam 24. Cut, and attach, six similar suspension lines 20, equally spaced, to the skirt of each end panel 18. Connect the free end of each suspension line 20 extending from the left front quarter of the canopy assembly 12 periphery to the left front slip-riser assembly 22 leg. Connect the free end of each suspension line 20 extending from the right front quarter of the canopy assembly 12 periphery to the right front slip-riser assembly 22 leg. Connect the free end of each suspension line 20 extending from the left rear quarter of the canopy assembly 12 periphery to the left rear slip-riser assembly 22 leg. Connect the free end of each suspension line 20 extending from the right rear quarter of the canopy assembly 12 periphery to the right rear slip-riser assembly 22 leg.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A semi-cylindrical type parachute, comprising:
    a. A canopy assembly, said canopy assembly comprising a plurality of canopy segments, wherein each canopy segment is comprised of two congruent isosceles trapezoidal gores each having a first and second bases parallel and opposite to each other, said first base longer than said second base, and two opposing and nonparallel longitudinal sides tapering linearly from the first base to the second base, the two gores are conjoined along their respective first bases forming an extended hexagonally-shaped canopy segment with a centerline span formed by the joined first bases and with parallel opposite front and rear edges formed by the second bases of the two gores, wherein the plurality of canopy segments are aligned laterally with collinearly aligned centerline spans and conjoined along the longitudinal edges of adjacent gores, forming a single-layer canopy having two lateral ends formed by the free longitudinal sides of the first and last canopy segment, and a front and a rear edges formed by the aligned second bases of the gores;
    b. Two end panels, said end panels having an arcuate upper edge and a bottom edge, wherein one of each end panel is conjoined by said upper edge to either lateral end of said canopy assembly;
    c. A plurality of suspension lines each having a first and a second end, wherein said first ends of a suspension lines are disposed on said front and rear edges of said canopy assembly; and d. A pair of suspension risers, wherein said second ends of said suspension lines are conjoined with said suspension risers.

2. The parachute of claim 1, wherein said canopy assembly has an aspect ratio substantially equal to 2.

3. The parachute of claim 1, wherein the shape of said arcuate upper edges of said two end panels are semi-circular.

4. The parachute of claim 1, wherein said canopy assembly has a rectangular horizontal profile.

5. The parachute of claim 1, wherein said two trapezoidal gores comprising each of said canopy segments are of the same dimensions.

6. The parachute of claim 1, wherein the first end of each suspension line is disposed on the front and rear edge of the canopy assembly at a seam between the longitudinal edges of two adjacent canopy segments and at the seam between each end panel and the adjacent canopy segment.

7. The parachute of claim 1, wherein the number of said canopy segments comprising said canopy assembly is seven.

* * * * *